United States Patent
Murarka et al.

(10) Patent No.: US 10,373,286 B2
(45) Date of Patent: Aug. 6, 2019

(54) METHOD AND APPARATUS FOR PERFORMING TILE-BASED RENDERING

(71) Applicant: SAMSUNG ELECTRONICS CO., LTD., Suwon-si, Gyeonggi-Do (KR)

(72) Inventors: Yogesh Somprakash Murarka, Bangalore (IN); Rachna Saxena, Bangalore (IN); Sundeep Krishnadasan, Bangalore (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 21 days.

(21) Appl. No.: 15/666,123

(22) Filed: Aug. 1, 2017

(65) Prior Publication Data

US 2018/0040098 A1 Feb. 8, 2018

(30) Foreign Application Priority Data

Aug. 3, 2016 (IN) .............................. 201641026546
Feb. 27, 2017 (KR) ......................... 10-2017-0025653

(51) Int. Cl.
*G06T 1/20* (2006.01)
*G06T 11/00* (2006.01)
*G06T 11/40* (2006.01)
*G06T 1/60* (2006.01)

(52) U.S. Cl.
CPC .............. *G06T 1/20* (2013.01); *G06T 11/001* (2013.01); *G06T 11/40* (2013.01); *G06T 1/60* (2013.01)

(58) Field of Classification Search
CPC ......... G06T 11/001; G06T 11/40; G06T 1/20; G09G 2360/122
See application file for complete search history.

(56) References Cited

U.S. PATENT DOCUMENTS

| 7,167,171 | B2 | 1/2007 | Heim et al. |
| 8,144,167 | B2 | 3/2012 | Langtind et al. |
| 8,385,425 | B2 | 2/2013 | Crinon |
| 8,638,337 | B2 | 1/2014 | Tung et al. |
| 8,970,580 | B2 | 3/2015 | Jang et al. |
| 2011/0074765 | A1 | 3/2011 | Oterhals et al. |

(Continued)

OTHER PUBLICATIONS

"NVIDIA CUDA C Programming Guide—Version 3.2" pp. 1-183. Nov. 9, 2010. Accessed via web @ http://cds.iisc.ac.in/faculty/vss/courses/PPP/CUDA_C_Programming_Guide.pdf on Mar. 21, 2019. (Year: 2010).*

(Continued)

*Primary Examiner* — Antonio A Caschera
(74) *Attorney, Agent, or Firm* — F. Chau & Associates, LLC (57) ABSTRACT

A method and an apparatus that performs tile-based rendering. The method includes receiving a first drawcall used for rendering a first tile of a preceding frame; receiving a second drawcall used for rendering a second tile of a succeeding frame corresponding to a position of the first tile; generating a signature of the first drawcall and a signature of the second drawcall; comparing the signature of the first drawcall to the signature of the second drawcall. Based on a result of the comparison of the signature of the first drawcall and the signature of the second drawcall, rendering the second tile by using a result of rendering the first tile when a pre-set condition is satisfied.

20 Claims, 8 Drawing Sheets

(56) References Cited

U.S. PATENT DOCUMENTS

| | | |
|---|---|---|
| 2011/0074800 A1 | 3/2011 | Stevens et al. |
| 2012/0176386 A1 | 7/2012 | Hutchins |
| 2012/0223939 A1 | 9/2012 | Noh et al. |
| 2014/0063030 A1 | 3/2014 | Metcalfe |
| 2014/0285497 A1 | 9/2014 | Fonseca |
| 2014/0354664 A1 | 12/2014 | Brown |
| 2015/0187123 A1 | 7/2015 | Hwang et al. |
| 2015/0228113 A1 | 8/2015 | Park et al. |
| 2015/0229927 A1 | 8/2015 | Inada et al. |
| 2015/0287233 A1 | 10/2015 | Shin et al. |
| 2016/0328820 A1* | 11/2016 | Fernandez ................ G06T 1/60 |
| 2017/0206623 A9* | 7/2017 | Hakura ................... G06T 17/20 |

OTHER PUBLICATIONS

Sharp et al., "https://www.khronos.org/registry/gles/extensions/QCOM/QCOM_tiled_rendering.txt", 2009, 6 pages.

* cited by examiner

METHOD AND APPARATUS FOR PERFORMING TILE-BASED RENDERING

CROSS-REFERENCE TO RELATED APPLICATIONS

This application claims the benefit of priority from Indian Patent Application No. 201641026546, filed on Aug. 3, 2016, in the Indian Patent Office, and from Korean Patent Application No. 10-2017-0025653, filed on Feb. 27, 2017, in the Korean Intellectual Property Office, the disclosures of which are incorporated by reference herein.

TECHNICAL FIELD

The inventive concept relates to a graphics processing unit (GPU), and more particularly, to a method and an apparatus for performing tile-based rendering using a GPU.

DISCUSSION OF THE RELATED ART

GPUs, particularly GPUs operating in electronic devices with relatively low processing capabilities, such as mobile phones, facilitate data processing by dividing each frame into smaller units for processing. For example, tiles may be processed after a frame is divided into smaller units, and the tiles may be stitched together to render an image.

Conventionally, every displayed frame related to data is divided into tiles and subsequently processed. However, in most cases, the contiguous frames display the same/similar objects. In this case, the contiguous frames may include many or all of the same tiles from a previous (e.g. preceding) frame.

SUMMARY

The inventive concept provides a method and a system for tile-based rendering. According to the inventive concept, by rendering a tile of a succeeding frame identical to a tile of a preceding frame, the computational overhead may be reduced, thereby enhancing the performance of a GPU.

According to an embodiment of the inventive concept, there is provided a method of performing tile-based rendering in a graphics processing apparatus, the method including receiving a first drawcall to render a first tile of a preceding frame; receiving a second drawcall to render a second tile of a succeeding frame, the second tile of the succeeding frame corresponding to a position of the first tile of the preceding frame; generating a signature of the first drawcall and a signature of the second drawcall; comparing the signature of the first drawcall to the signature of the second drawcall and determining whether a pre-set condition is satisfied; and rendering the second tile by using a result of a rendering of the first tile when the pre-set condition is satisfied.

The pre-set condition may include determining whether the signature of the first drawcall is identical to the signature of the second drawcall.

The second tile may be rendered independent of the result of the rendering of the first tile when the pre-set condition is not satisfied.

According to an embodiment of the inventive concept, there is provided a graphics processing apparatus for performing tile-based rendering, the graphics processing apparatus including a memory configured to store at least one instruction; and at least one processor configured to execute the at least one instruction stored in the memory, wherein the at least one processor executes the at least one instruction to receive a first drawcall used for rendering a first tile of a preceding frame, receive a second drawcall used for rendering a second tile of a succeeding frame corresponding to a position of the first tile, generate a signature of the first drawcall and a signature of the second drawcall, compare the signature of the first drawcall to the signature of the second drawcall, and, based on a result of the comparison, render the second tile by using a result of rendering the first tile.

According to an embodiment of the inventive concept, there is provided a method of performing tile-based rendering in a graphics processing apparatus, the method including processing at least one drawcall related to each of a preceding frame and a succeeding frame to identify at least one tile included in the succeeding frame identical to a tile included in the preceding frame; storing the at least one tile from the preceding frame to render the succeeding frame; and rendering the succeeding frame by using the stored at least one tile.

According to an embodiment of the inventive concept, there is provided a method of performing tile-based rendering in a graphics processing apparatus, the method including processing at least one drawcall related to each of a preceding frame and a succeeding frame to identify at least one tile included in the succeeding frame identical to a tile included in the preceding frame; storing the at least one tile from the preceding frame to render the succeeding frame; and rendering the succeeding frame by using the stored at least one tile.

According to an embodiment of the inventive concept, there is provided a graphics processing apparatus including a memory configured to store at least one instruction; and at least one processor configured to execute the at least one instruction stored in the memory, wherein the at least one processor processes at least one drawcall related to each of a preceding frame and a succeeding frame, identifies at least one tile included in the succeeding frame identical to a tile included in the preceding frame by analyzing the processed drawcalls, and stores the at least one tile from the preceding frame for rendering the succeeding frame.

Furthermore, the at least one processor may execute the at least one instruction, thereby identifying a plurality of drawcalls related to the preceding frame from signatures of the drawcalls related to the preceding frame, identifying a plurality of drawcalls related to the succeeding frame from signatures of the drawcalls related to the succeeding frame, identifying at least one drawcall that affects the preceding frame and the succeeding frame, identifying at least one drawcall, included in the succeeding frame, identical to a drawcall included in the preceding frame, and, based on a similarity between the identified at least one drawcall included in the succeeding frame and the drawcall of the preceding frame, identifying at least one tile in the preceding frame, the at least one tile to be rendered in the succeeding frame.

Furthermore, the at least one processor may execute the at least one instruction, thereby correlating at least one drawcall of the preceding frame to at least one drawcall of the succeeding frame and identifying at least one change of the at least one drawcall between the preceding frame and the succeeding frame, wherein the at least one change is identified based on at least one execution mode and at least one of an input, and the input includes at least one vertex buffer, at least one index buffer, at least one attribute buffer, at least one shader, and at least one texture.

Furthermore, the at least one processor may execute the at least one instruction, thereby re-rendering the at least one tile identified in the preceding frame in the succeeding frame.

Furthermore, the at least one processor may execute the at least one instruction, thereby using the dynamic texture for the tile rendering.

The at least one processor may compare the signature of the first drawcall to the second drawcall by calculation of a checksum, cyclic redundancy check (CRC), or hash value of the signature of the first drawcall and the signature of the second drawcall, and determine whether the checksum, cyclic redundancy check (CRC), or hash value of the signature of the first drawcall are equal to checksum,cyclic redundancy check (CRC), or hash value of the signature of the second drawcall.

A graphics processing apparatus may include a memory configured to store at least one instruction; and at least one processor configured to execute the at least one instruction stored in the memory, wherein the at least one processor executes the at least one instruction to receive a first drawcall to render a first tile of a preceding frame, receive a second drawcall to render a second tile of a succeeding frame corresponding to a position of the first tile of the preceding frame, generate a signature of the first drawcall and a signature of the second drawcall, compare the signature of the first drawcall to the signature of the second drawcall to determine whether a pre-set condition is satisfied, and render the second tile by using a result of a rendering of the first tile when the pre-set condition is satisfied.

The at least one processor may render the second tile independent of the first tile when the pre-set condition is not satisfied.

The graphics processing apparatus may include a central processing unit (CPU) that executes a graphics application programming interface: the at least one processor includes a graphics processing unit (GPU) that is configured to execute draw commands received from the CPU, wherein the draw commands include the first drawcall and the second drawcall received from the CPU; and the GPU may include at least one cache memory that stores graphic data included in the draw commands.

The graphics processing apparatus may include an input/output (I/O) interface including at least one channel to an application for communication with the GPU, and an output interface for displaying a frame to be rendered to a user; a graphics driver configured to fetch drawcalls related frames being processed; and a memory configured to store data related to a respective plurality of tiles in the preceding frame and the succeeding frame including the first tile and the second tile, and store information for the at least one processor to identify common tiles in the preceding frame and the succeeding frame.

The at least one processor may process the preceding frame and the succeeding frame one at a time, and the preceding frame and the succeeding frame are contiguous frames.

The at least one processor may process the preceding frame and the succeeding frame one at a time, and the preceding frame and the succeeding frame are non-contiguous frames.

The at least one processor may be configured to compare the signature of the first drawcall and the signature of the second drawcall by executing at least one of checksum operation, a cyclic redundancy check (CRC), or a hash value of data of the signature of the first drawcall and the signature of the second drawcall.

According to an embodiment of the inventive concept, there is provided a non-transitory computer readable recording medium having recorded thereon a computer program for implementing the above-stated methods.

BRIEF DESCRIPTION OF THE DRAWINGS

Embodiments of the inventive concept will be better appreciated by a person of ordinary skill in the art from the following detailed description taken in conjunction with the accompanying drawings in which.

DETAILED DESCRIPTION

Figure 1:
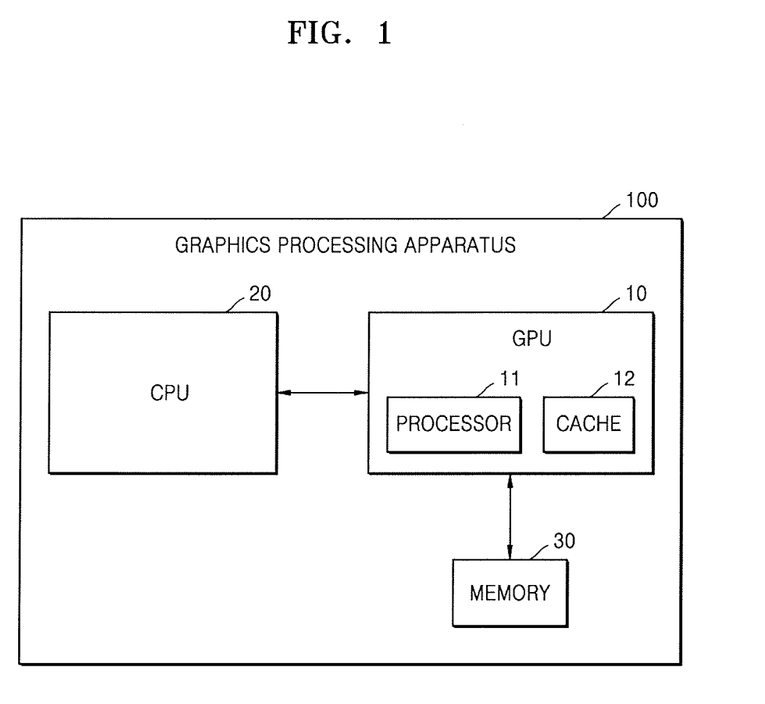
FIG. 1 is a diagram illustrating a graphics processing apparatus according to an embodiment of the inventive concept.

FIG. 1 is a diagram illustrating a graphics processing apparatus according to an embodiment of the inventive concept.

Referring to FIG. 1, a graphics processing apparatus 100 may include a graphics processing unit (GPU) 10, a central processing unit (CPU) 20, and a memory 30. One of ordinary skill in the art will understand that general-purpose components other than the components shown in FIG. 1 may be additionally included.

The graphics processing apparatus 100 may be, for example, a desktop computer, a laptop computer, a smartphone, a personal digital assistant (PDA), a portable media player, a video game console, a TV set-top box, a tablet device, an e-book reader, or a wearable device, but is not limited thereto. In other words, the graphics processing apparatus 100 is a device having a graphics processing function for displaying content, and examples of the graphic processing apparatus 100 may include various devices.

The GPU 10 is a graphics processor dedicated to the execution of various versions and types of graphics pipelines, such as open graphic(s) library (OpenGL), DirectX, and compute unified device architecture (CUDA), and may be hardware implemented to execute a 3-dimensional graphics pipeline that renders 3-dimensional objects of an image to 2-dimensional images to be displayed. For example, the GPU 10 may execute code to perform various functions that include, for example, shading, blending, and illuminating, and various other functions to generate pixel values for pixels to be displayed.

The GPU 10 may receive a draw command from the CPU 20. The draw command indicates which object to render in an image or a frame. For example, the draw command may provide instructions to draw a certain number of squares or triangles included in an image or a frame. According to an embodiment of the inventive concept, the draw command may be a drawcall.

The GPU 10 may include at least one processor 11 and at least one cache 12. The processor 11 may store, in the cache 12, graphics data included in a received drawcall and graphics data received from the memory 30. The processor 11 may also execute each stage of a graphics pipeline by using the graphics data stored in the cache 12 based on the graphics data included in the received drawcall.

On the other hand, graphics data is data used for image rendering. According to an embodiment, the graphics data may include vertex data, index data, attribute data, shaders, and textures, but is not limited thereto.

The CPU 20 is hardware that controls the overall operations and functions of the graphics processing apparatus 100, and may perform control of operations and functions of the graphic processing apparatus in conjunction with executable code. For example, the CPU 20 may: execute code, such as an operating system (OS), call a graphics application programming interface (API) for the GPU 10, and execute a driver of the GPU 10. Furthermore, the CPU 20 may execute various applications stored in the memory 30, e.g., a web browsing application, a game application, a video application, etc.

With continued reference to FIG. 1, the memory 30 is hardware for storing various data processed by the graphics processing apparatus 100 and may store data processed by the GPU 10 and data to be processed by the GPU 10. Furthermore, the memory 30 may store applications and drivers to be executed by the GPU 10 and the CPU 20. The memory 30 may be embodied as, for example, a random-access memory (RAM), such as a dynamic random-access memory (DRAM) and a static random-access memory (SRAM), a read-only memory (ROM), an electrically erasable programmable read-only memory (EEPROM), a CD-ROM, a Blu-ray, other optical disc storages, a hard disk drive (HDD), a solid state drive (SSD), or a flash memory, and may further include an external storage device that may be accessed by the graphics processing apparatus 100.

In addition, the graphics processing apparatus 100 may further include a display (not shown). The display may display a rendered image received from the CPU 20 or the GPU 10.

Figure 2:
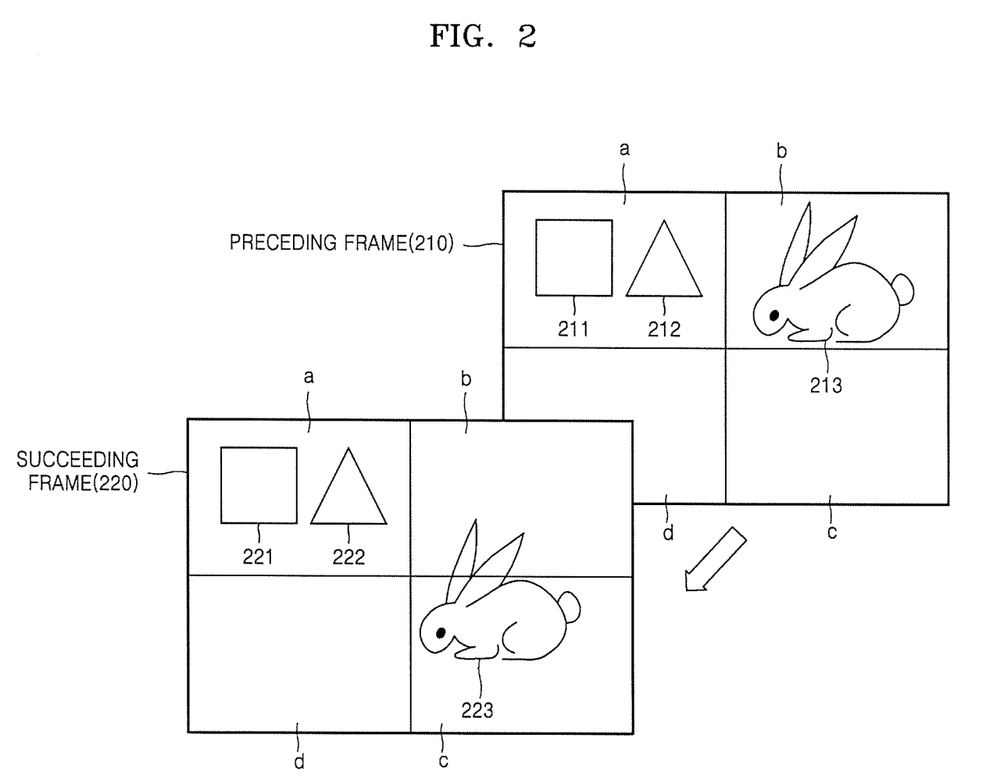
FIG. 2 is a diagram showing examples of a preceding frame and a succeeding frame including objects, according to an embodiment of the inventive concept.

FIG. 2 is a diagram showing examples of a preceding frame and a succeeding frame including objects, according to an embodiment of the inventive concept.

Referring now to FIG. 2, rectangles 211 and 221, triangles 212 and 222, and rabbits 213 and 223 may be included in a preceding frame 210 and a succeeding frame 220 as objects. On the other hand, when performing tile-based rendering, the graphics processing apparatus 10 may perform rendering with respect to each of tiles (tile a through tile d) that divide the preceding frame 210 and the succeeding frame 220.

According to an embodiment of the inventive concept, the graphics processing apparatus 10 may render the succeeding frame 220 using a result of rendering the preceding frame 210. For example, only the positions of the rabbits 213 and 223 may be changed from the preceding frame 210 to the succeeding frame 220, and the positions of the squares 211 and 221 and the triangles 212 and 222 may remain unchanged. In this case, the graphics processing apparatus 10 may use a result of the rendered tile of the preceding frame 210 to render the tile of the succeeding frame 220, which includes the respective rectangles 211 and 221 and the respective triangles 212 and 222.

In addition, it is also within the inventive concept that the succeeding frame may not be a next successive frame from the previously rendered frame. While it is more likely that a scene may have fewer or no changes in the tiles from a successive frame that is the next frame after the previously rendered frame (e.g. a contiguous succession), with regard to FIG. 2, it may be that the object (rabbit 223) may have previously moved so as to overlap into two tiles (b and c) similar to the succeeding frame 220, and the tiles from such a previous frame may be wholly or partly used to render the frame 220. In such a case, the frame and tile information would be selectable from a frame buffer in the memory 30. If the cache 12 were to have sufficient capacity to store tile information of more than one frame, an artisan should understand and appreciate that the access to such information would be faster from the cache 12 than from memory 30.

Figure 3:
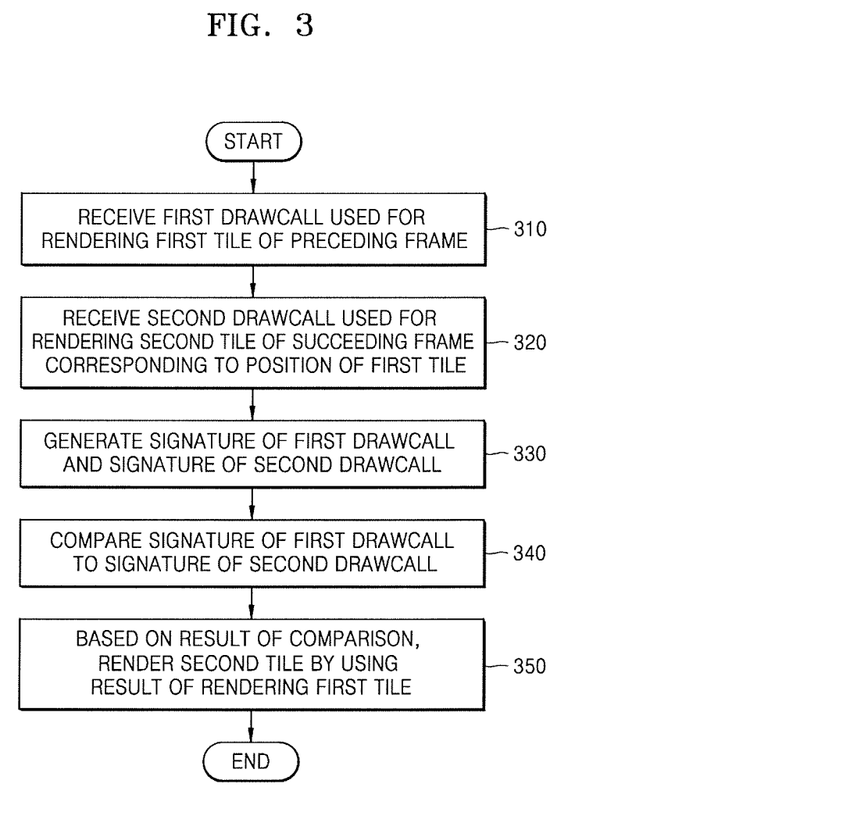
FIG. 3 is a flowchart illustrating a method of rendering a tile of a succeeding frame by using a result of a rendered tile from a preceding frame, according to an embodiment of the inventive concept.

FIG. 3 is a flowchart illustrating a method of rendering a tile of a succeeding frame by using a result of a rendered tile from a preceding frame, according to an embodiment of the inventive concept.

In operation 310, the graphics processing apparatus 10 may receive a first drawcall used to render a first tile of a first frame (e.g., the preceding frame). In operation 320, the graphics processing apparatus 10 may receive a second drawcall used to render a second tile of a second frame (e.g. the succeeding frame relative to the preceding frame). In this example, the second tile corresponds to the position of the first tile of the preceding frame.

Meanwhile, according to an embodiment of the inventive concept, there may be a plurality of first drawcalls used for rendering the first tile and a plurality of second drawcalls used for rendering the second tile. A drawcall may include parameters of calling functions and heir name, as well as parameters regarding a position, or a color, of graphic data to be displayed.

In operation 330, the graphics processing apparatus 10 may generate a signature of the first drawcall and a signature of the second drawcall. A signature of a drawcall may be a specific text string for identifying the corresponding drawcall from other drawcalls. The text string may be written in a header to identify the drawcall having the particular signature.

According to an embodiment of the inventive concept, the graphics processing apparatus 10 may generate a signature by using an execution context and graphics data related to the first drawcall and the second drawcall. For example, the graphics processing apparatus 10 may generate a signature by using an execution context including an OpenGL state (GL_TEXTURE_2D, GL_FOG, GL_BLEND, etc.) set during rendering. Furthermore, the graphics processing apparatus 10 may generate a signature by using graphics data, such as vertex data, index data, attribute data, shaders, textures, and uniforms. In addition, the graphics processing apparatus 10 may calculate a checksum of a signature by using an execution context and graphics data. In addition, other ways that a signature may be analyzed in addition to a checksum may also include, for example, a cyclic redundancy check (CRC), or a hash value of data of the signature. While the inventive concept is not limited to the aforementioned examples, the signature values may be compared, and the GPU may render, for example, the second tile of the succeeding frame independent of the first tile if one or more signatures of the first tile and the second tile are different.

In operation 340, the graphics processing apparatus 10 may compare the signature of the first drawcall to the signature of the second drawcall. According to an embodiment of the inventive concept, the graphics processing apparatus 10 may compare both of the signatures by calculating checksums of the signature of the first drawcall and the signature of the second drawcall.

In operation 350, the graphics processing apparatus 10 may render the second tile using a result of rendering the first tile, according to the result of the comparison. According to an embodiment, when the signature of the first drawcall is identical to the signature of the second drawcall, the graphics processing apparatus 10 may render the second tile by using a result of rendering the first tile. For example, the graphics processing apparatus 10 may reuse a result of rendering the first tile to render the second tile.

Furthermore, when the signature of the first drawcall is not identical to the signature of the second drawcall, the graphics processing apparatus 10 may re-render the second tile rather than use the result of the rendered first tile.

When there are a plurality of first drawcalls and a plurality of second drawcalls, and all of the signatures of the plurality of first drawcalls are identical to all of the signatures of the plurality of second drawcalls or a pre-set condition is satisfied, the graphics processing apparatus 10 may render the second tile by using a result of rendering the first tile. This operation may be performed for all of the tiles of the successive frame where there is an identical signature.

In addition, the same operations of FIG. 3 can be executed when the previous frame and the successive frame are not directly successive (e.g. not contiguous, there is another frame or frames that were generated after the frame in which the signatures of drawcalls are compared in FIG. 3).

Furthermore, another way to a preceding frame may be compared with a successive frame is based on the camera viewpoint. For example, the graphics processing apparatus 10 may determine whether a camera viewpoint regarding the succeeding frame is identical to a camera viewpoint regarding the preceding frame. The graphics processing apparatus 10 may determine the camera viewpoint of a particular frame by analyzing vertex shaders and/or uniforms of a drawcall. For example, when the uniforms of a drawcall between the preceding frame and the succeeding frame are equal to or greater than a pre-set value, the graphics processing apparatus 10 may determine that the camera viewpoint regarding the preceding frame is identical to the camera viewpoint of the succeeding frame.

According to an embodiment of the inventive concept, when it is determined by the graphics processing apparatus that the camera viewpoint regarding the preceding frame is identical to the camera viewpoint regarding the succeeding frame, the graphics processing apparatus 10 may determine whether to use a result of rendering the first tile of the preceding frame to render the second tile of the succeeding frame. Furthermore, according to an embodiment of the inventive concept, when the graphics processing apparatus determines that the camera viewpoint regarding the preceding frame is not identical to the camera viewpoint regarding the succeeding frame, the graphics processing apparatus 10 may re-render all of the tiles included in the succeeding frame. One reason for such re-rendering may be that a different camera view point would cause most of the tiles to display differently positioned backgrounds and/or foregrounds.

Figure 4A:
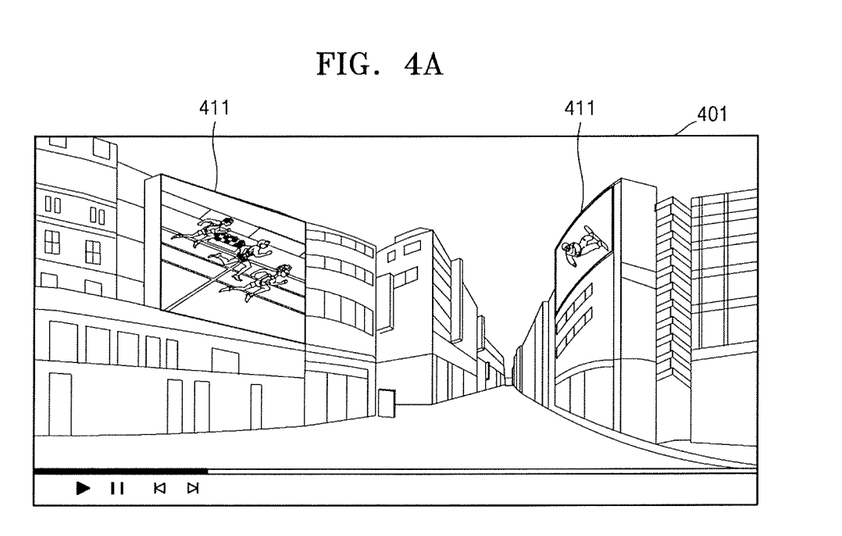
FIGS. 4A and 4B are a diagrams illustrating a dynamic texture according to an embodiment of the inventive concept.
Figure 4B:
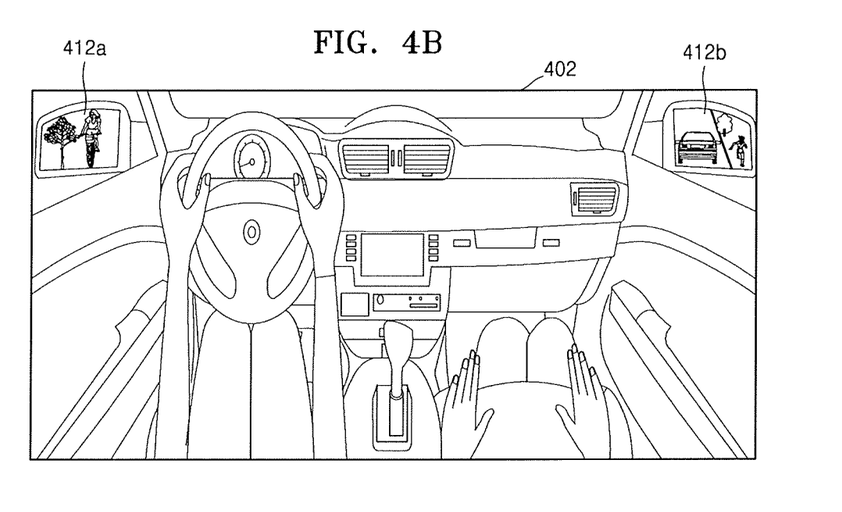

FIG. 4 is a diagram illustrating the rendering of an image having a dynamic texture according to an embodiment of the inventive concept.

Referring now to FIG. 4, a dynamic texture refers to a dynamic image rendered in real time that is utilized as a texture. For example, when there is an object corresponding to an electric signboard 411 from among objects to be displayed on a frame 401, an image of a certain scene may be displayed on a screen of the electric signboard 411. An image to be displayed on the screen of the electric signboard 411 may also be dynamically changed in correspondence to a frame change. In addition, there may be a dynamic texture generated in a case where the rest of the frame may not change.

Similarly, with reference to the frame 402, a scene of a car that is being driven may be rendered on the frame 402. As an environment outside of the car is displayed on the left and rightside mirrors 412a, 412b of the car, an image to be displayed on the one or both of the side mirrors 412a, 412b may be dynamically changed in correspondence to a frame change.

When there is a separate object to display a dynamic image thereon in a certain frame, the dynamic texture described according to an embodiment of the inventive concept may refer to a texture to be textured onto the object.

Figure 5:
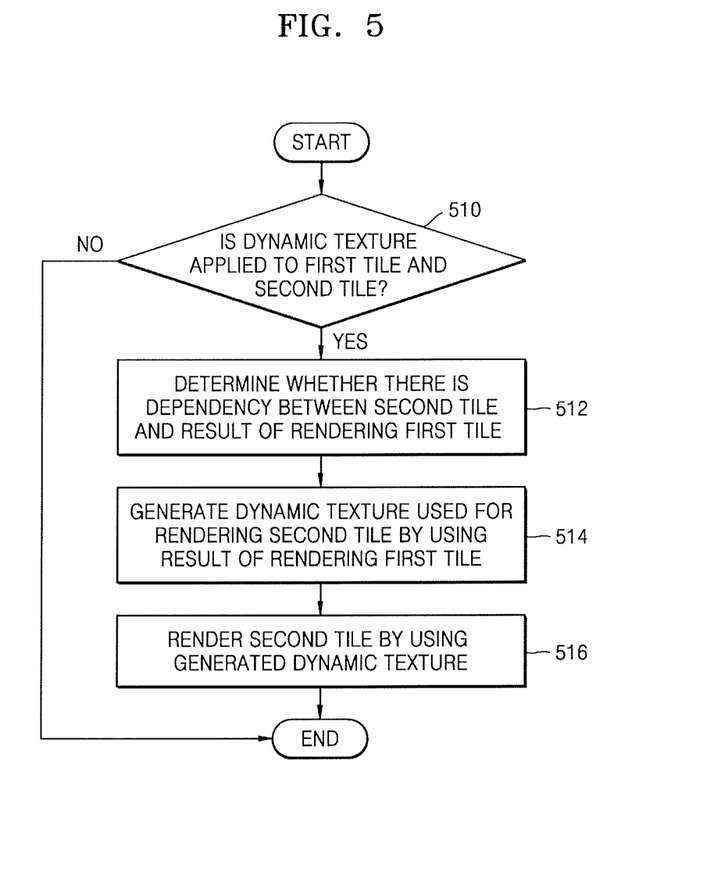
FIG. 5 is a flowchart illustrating a method of rendering a tile of a succeeding frame by using a result of a rendered tile from a preceding frame when there is a dynamic texture, according to an embodiment of the inventive concept.

FIG. 5 is a flowchart illustrating a method of rendering a tile of a succeeding frame by using a result of a rendered tile from a preceding frame when there is a dynamic texture, according to an embodiment of the inventive concept.

Referring to FIG. 5, in operation 510, the graphics processing apparatus 100 may determine whether a dynamic texture is applied to a first tile of the preceding frame and a second tile of the succeeding frame. An example of dynamic texture is shown in FIGS. 4A and 4B. In addition, a texture used in a graphic processing operation may be determined and stored in a memory in advance or may be generated in real time. When such a texture is generated in real time during a graphic processing operation, the texture is referred to as a dynamic texture. A dynamic texture may be compressed before being stored in a memory to reduce a memory bandwidth and power consumption for reading/writing the dynamic texture.

In operation 512, when a dynamic texture is applied to the first tile and the second tile, the graphics processing apparatus 10 may determine whether there is a dependency between the second tile and a result of rendering the first tile. According to an embodiment of the inventive concept, the graphics processing apparatus 10 analyzes a shader included in a first drawcall and a shader included in a second drawcall and identifies whether a dynamic texture is mapped to the first drawcall and the second drawcall, thereby determining whether a final image to be rendered depends on the dynamic texture. However, a method of determining whether a final image to be rendered depends on a dynamic texture is not limited to the aforementioned example.

In operation 514, when there is a dependency between the second tile and the result of rendering the first tile, the graphics processing apparatus 100 may generate a dynamic texture to be used for rendering the second tile by using the result of rendering the first tile. According to an embodiment of the inventive concept, when there is a dependency between the second tile and the result of rendering the first tile, the graphics processing apparatus 10 may generate a dynamic texture to be used for rendering the second tile by using an image generated as a result of rendering the first tile.

In operation 516, the graphics processing apparatus 10 may render the second tile by using the generated dynamic texture.

Figure 6:
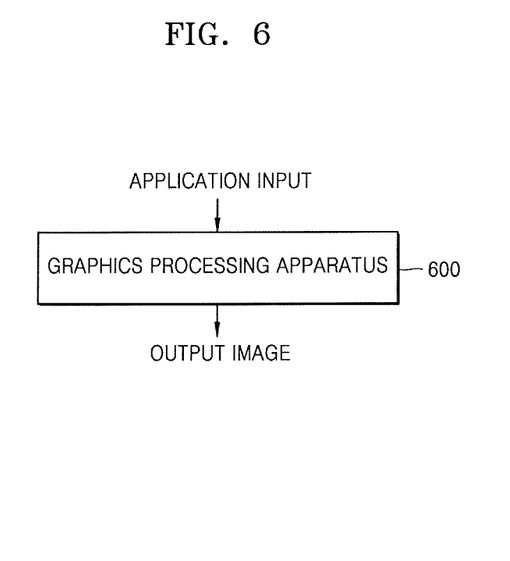
FIG. 6 is a diagram showing an input and an output of a graphics processing apparatus according to an embodiment of the inventive concept.

FIG. 6 is a diagram showing an input and an output of a graphics processing apparatus according to an embodiment of the inventive concept.

A graphics processing apparatus 600 may receive at least one application input to initiate the rendering of an image. The application input may include a drawcall and related information for rendering at least one tile. The related information may include, but is not limited to, for example, a command that instructs the graphics processing apparatus 600 to read data from the memory, write data to the memory, and set an environment for executing a drawcall. In response to the application input, the graphics processing apparatus 600 may process the received application input and identify the drawcall or drawcalls related to each frame belonging to an image to be displayed. The application input may be related to rendering of a plurality of frames. However, the graphics processing apparatus 600 may render one frame at a time. The graphics processing apparatus 600 may process the drawcall or drawcalls and identify a same tile or same tiles in two frames (a preceding frame and a succeeding frame below) based on one of the aforementioned examples discussed herein above. On the other hand, processing of drawcalls may include processing all or some of the drawcalls. According to an embodiment of the inventive concept, the preceding frame and the succeeding frame may be contiguous/successive frames. According to an embodiment of the inventive concept, the preceding frame and the succeeding frame may be any two frames included in an application to be displayed, and the preceding frame and the succeeding frame may not be contiguous (successive). In other words, there may be frames that were created between the preceding frame the successive frame (e.g., intervening frames). Meanwhile, an application may include any suitable data for generating an image, a video, a video game, or a series of frames. A CPU (not shown) in FIG. 6 may control the application input of the drawcall and the related information for rendering at least one tile.

Furthermore, the graphics processing apparatus 600 may process preceding frames and succeeding frames one at a time. For example, the graphics processing apparatus 600 may process drawcalls related to a preceding frame, and signatures of the processed drawcalls may be generated and stored in a corresponding database in a storage space related to the graphics processing apparatus 600. Furthermore, the graphics processing apparatus 600 may process a succeeding frame to generate signatures of drawcalls related to the succeeding frame. Furthermore, the graphics processing apparatus 600 may compare the signatures of the drawcalls related to the succeeding frame to the signatures of the drawcall related to the preceding frame to identify a same tile (or same tiles) in the preceding frame and the succeeding frame. The tiles generated in the preceding frame with the same signatures of the drawcalls of the succeeding frame may be used in the generation of tiles of the successive frame to reduce the computational load and/or may reduce the power used to generate the tiles of the successive frame.

According to an embodiment of the inventive concept, when a preceding frame is processed for the first time by the graphics processing apparatus 600, signatures of drawcalls related to the preceding frame may be generated, and the signature of the drawcalls related to the preceding frame may be stored in a database for subsequent use for reference purposes with drawcalls of a succeeding frame. Furthermore, signatures of drawcalls related to a succeeding frame may be stored in the database to be compared with signatures related to drawcalls of yet another frame to identify a same tile or same tiles at any time point. Thus, according to the inventive concept, there can be reduction of the computational overhead of the graphic processing apparatus. There can also be a decrease in the time it takes to render one or more succeeding frames based on a comparing as whether there are identical signatures for drawcalls of one or more tiles from the preceding frame when compared with the signatures of drawcalls of one or more tiles of the one or more successive frames.

Furthermore, when there is a determination by the graphic processing apparatus 600 that there is at least one identified tile in common with a preceding frame and a succeeding frame based on signatures of drawcalls related to the preceding frame and signatures of drawcalls related to the succeeding frame. The graphics processing apparatus 600 may identify an application input to be rendered. For example, when the graphics processing apparatus determines that there is a tile in common with a preceding frame and a succeeding frame, the common tile may be copied "as-is" to the succeeding frame (in other words, the common tile generated in the preceding frame is reused in the succeeding frame). The remaining tiles of the succeeding frame are identified as a part of an application input to be re-rendered, and such remaining tiles may be re-rendered by the graphics processing apparatus 600.

Figure 7:
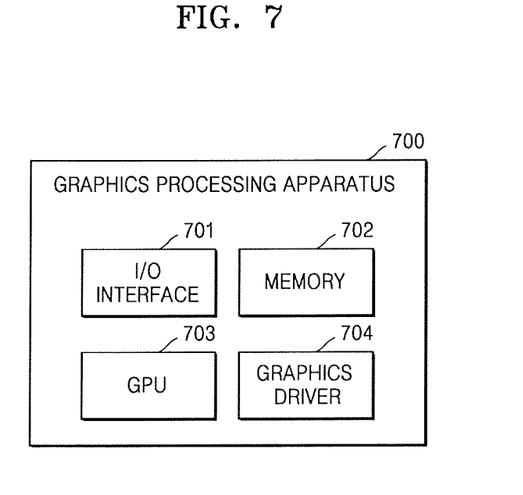
FIG. 7 is a block diagram showing components of a graphics processing apparatus according to an embodiment of the inventive concept.

FIG. 7 is a block diagram showing components of a graphics processing apparatus according to an embodiment of the inventive concept. A graphics processing apparatus 700 may include, for example, an input/output (I/O) interface 701, a memory 702, a graphics processing unit (GPU) 703, and a graphics driver 704.

The I/O interface 701 may provide at least one channel in which an application may communicate with the GPU 703. Furthermore, the I/O interface 701 may include at least one output interface for displaying a frame to be rendered to a user. For example, a display screen may be used to display an output of the GPU 703 to a user. The output of the GPU may be provided, for example, to a buffer prior to display.

The memory 702 may store any kind of data related to an image rendering process. For example, the memory 702 may store data to be rendered in the form of frames and store drawcalls corresponding thereto. The memory 702 may also store data related to tiles in a preceding frame and a succeeding frame and may provide information regarding the stored data to identify common tiles in the preceding frame and the succeeding frame. For future reference, the memory 702 may also store information regarding rendered tiles and re-rendered tiles in each frame. The memory 702 may operate as a buffer in which one or more tiles in a frame may be maintained to facilitate being rendered in a succeeding frame. Furthermore, the memory 702 may store signatures corresponding to all frames being processed.

The GPU 703 and the driver 704 may search for similar tiles in at least seven frames. According to an embodiment of the inventive concept, two frames, that is, a preceding frame and a succeeding frame, may be processed one at a time. When processing frames, the driver module 704 may fetch drawcalls related to the frames being processed. Furthermore, by processing drawcalls and any related data, a frame-specific drawcall signature may be generated. In a case of a drawcall that requests rendering by use of a dynamic texture, the dynamic texture may not be a part of the signature of the drawcall. Signatures of drawcalls of a succeeding frame may be compared to signatures of drawcalls of a preceding frame, and thus modified drawcalls may be identified. According to various embodiments of the inventive concept, when a drawcall no longer exists in a succeeding frame, or when a drawcall produces a different output in a succeeding frame (when a dynamic texture exists, this shall be ignored), it may be determined that a drawcall of a preceding frame is modified in the succeeding frame. Similarly, a drawcall added in the succeeding frame (a drawcall that does not exist in the preceding frame) may be determined as a modified drawcall. A list of modified drawcalls may be provided as an input to the GPU 703. The GPU 703 may identify a tile or tiles that is(are) common in analyzed frames by analyzing a list of modified drawcalls received from the driver module 704. Based on information regarding common tiles, the GPU 703 may identify an application input related to the succeeding frame that is to be rendered. The GPU 703 may determine that a tile or tiles identified as being common may be reused from the preceding frame. Thus, even though the signature of a drawcall of the preceding frame and a succeeding frame may be different based on the drawcall being modified or non-existent in the succeeding frame, there may still be a commonality among one or more tiles, and such tiles may be reused in the rendering of the succeeding frame to reduce the computational workload. It is also within the inventive concept that the memory may store tiles of designated backgrounds (e.g. popular colors, places of interest) so that when rendering a frame, such commonly used backgrounds may be retrieved from memory rather than generated in the rendering of a frame of an image. Furthermore, the GPU 703 may also render or re-render appropriate tiles in response to a received application input.

Figure 8:
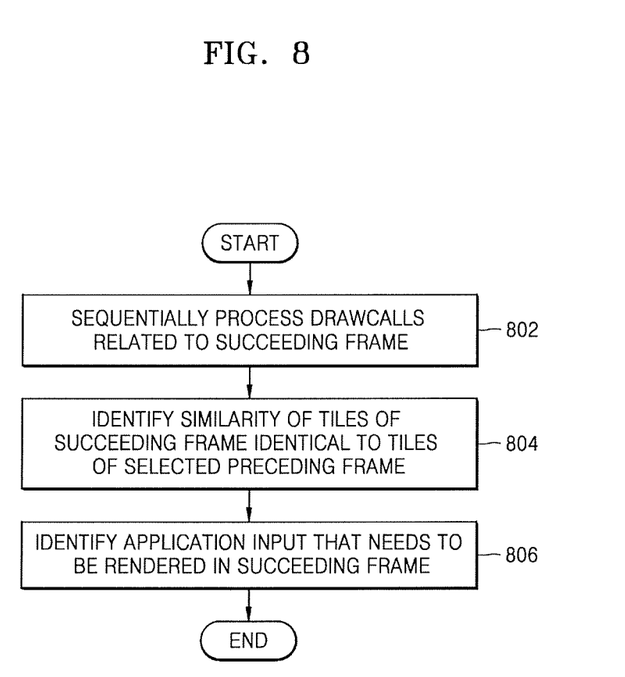
FIG. 8 is a flowchart of a method of performing tile-based rendering in a graphics processing apparatus, according to an embodiment of the inventive concept.

FIG. 8 is a flowchart of a method of performing tile-based rendering in a graphics processing apparatus, according to an embodiment of the inventive concept.

When the graphics processing apparatus 600 receives an application input for rendering a frame, the graphics processing apparatus 600 may collect drawcalls, related data, and auxiliary commands corresponding to the application input. According to an embodiment of the inventive concept, the application input may be related to rendering of a plurality of frames. Meanwhile, the graphics processing apparatus 600 may render only one frame at a time.

In operation 802, the graphics processing apparatus 600 may sequentially process drawcalls related to a succeeding frame. According to an embodiment, drawcalls belonging to at least seven frames may be sequentially processed one-by-one by the graphics processing apparatus 600. A person of ordinary skill in the art should understand and appreciate that according to the inventive concept, more than seven frames or less than seven frames may be sequentially processed one-by-one by the graphics processing apparatus 600.

In operation 804, the graphics processing apparatus 600 may identify tiles of the succeeding frame that are identical to tiles of a selected preceding frame. According to an embodiment of the inventive concept, based on drawcalls related to each tile, the graphics processing apparatus 600 may identify similarity between tiles of the preceding frame and tiles of the succeeding frame. Information obtained from a comparison of drawcalls may be used to indicate whether there are tiles that did not change from the preceding frame to the succeeding frame. According to an embodiment of the inventive concept, when no tile is changed in different frames, drawcalls corresponding to the tiles remain unchanged. In addition, according to an embodiment of the inventive concept, frames being processed (e.g., a preceding frame and a succeeding frame) may be adjacent to each other. According to another embodiment, frames being processed may not be adjacent to each other.

In operation 806, based on identified common tiles (if any), the graphics processing apparatus 600 may identify an application input that is to be rendered in the succeeding frame. According to an embodiment, when a common tile or common tile(s) is(are) identified between a preceding frame and a succeeding frame, the identified common tile(s) is(are) maintained in the succeeding frame, and the remaining portion of the application input may be re-rendered by the graphics processing apparatus 600.

Figure 9:
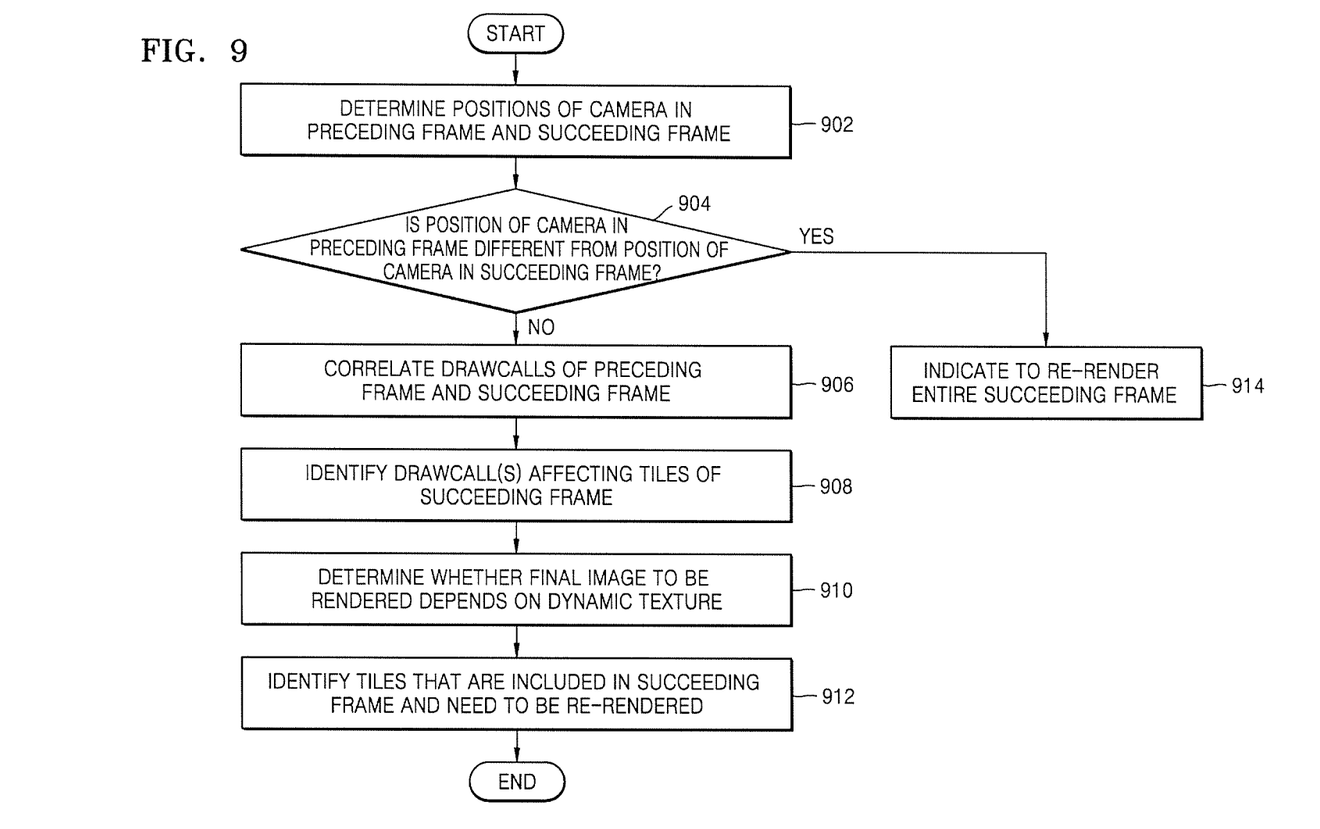
FIG. 9 is a flowchart of a method of identifying similar tiles included in a preceding frame and a succeeding frame for tile-based rendering, according to an embodiment of the inventive concept.

FIG. 9 is a flowchart of a method of identifying similar tiles included in a preceding frame and a succeeding frame for tile-based rendering, according to an embodiment of the inventive concept.

In operation 902, the graphics processing apparatus 600 may check a position (or positions) of a camera in a preceding frame and a succeeding frame. According to an embodiment of the inventive concept, the graphics driver 704 (FIG. 7) may detect and verify a position of a camera in a preceding frame and a succeeding frame to verify whether the position of the camera has changed in the frames. According to an embodiment, the graphics driver 704 may identify a change of the position of the camera based on an input to a vertex shader.

When a "model view transform" matrix remains unchanged in a preceding frame and a succeeding frame for most of drawcalls, it may be determined that the position of a camera is the same in the preceding frame and succeeding frame. When the position of the camera has changed in the succeeding frame, it may be determined that almost all tiles of the succeeding frame are changed as compared to tiles of the preceding frame, and thus there may be a determination that there is no tile in the preceding frame that is the same as a tile in the succeeding frame being analyzed.

In operation 904, the graphics processing apparatus 600 may determine whether the position of the camera is different in the preceding frame and the succeeding frame. When it is determined that the position of the camera is different, the method may proceed to operation 914. In operation 914, the graphics processing apparatus 600 may indicate that the succeeding frame is to be re-rendered. For example, all of the times constituting the frame may be rendered without any tiles from a previous frame being re-used. On the other hand, when it is determined that position of the camera in the preceding frame is the same as the position of the camera in the succeeding frame, the method may proceed to operation 906.

In operation 906, the graphics processing apparatus 600 may correlate drawcalls of the preceding frame and the succeeding frame. According to an embodiment of the inventive concept, when the position of the camera is same in the two frames, drawcalls related to frames being analyzed may be processed by the graphics driver 704 (FIG. 7) and correlated. On the other hand, various parameters, such as an execution mode, vertex/index/attribute buffers, shaders, and drawcall-specific textures, may be compared to identify any change in the position of the cameras and a degree thereof.

In operation 908, the graphics processing apparatus 600 may identify a drawcall or drawcalls that affect each tile of the plurality of tiles included in the succeeding frame.

According to an embodiment, the drawcall or drawcalls that affect each of tiles in the frames being processed may be identified by the GPU 703.

In operation 910, the graphics processing apparatus 600 may identify whether a final image to be rendered depends on a dynamic texture. According to an embodiment of the inventive concept, when there is a dynamic texture, the GPU 703 or the graphics driver 704 may determine whether a final image to be rendered depends on the dynamic texture. Furthermore, dependencies between dynamic textures in different tiles and a final image to be rendered may also be identified.

In operation 912, the graphics processing apparatus 600 may identify tiles included in the succeeding frame that are to be re-rendered. According to an embodiment, the GPU 703 may analyze drawcalls and identify a common tile or common tiles in the preceding frame and the succeeding frame based on a similarity between the drawcalls being analyzed. The GPU 703 may maintain an identified tile or identified tiles to be re-used in the succeeding frame, and may also determine a portion of the application input to be rendered again. According to an embodiment, when it is determined, for example, from analyzing the drawcalls that one or more tiles from the preceding frame are unchanged in the succeeding frame, the corresponding tiles are maintained in the succeeding frame and only the remaining tiles of the succeeding frame are to be re-rendered, thereby reducing a data throughput.

In addition, a person or ordinary skill in the art should understand and appreciate that the various operations of FIGS. 3, 5, 8, and 9 may be performed in the order shown therein, or in a different order from the order shown therein, or concurrently. Furthermore, according to some embodiments of the inventive concept, the operations shown in FIGS. 3 through 6 may be omitted.

While the inventive concept has been particularly shown and described with reference to certain embodiments provided herein for illustrative purposes, a person of ordinary skill in the art should understand that various changes in form and details may be made therein without departing from the spirit and scope of the following claims.

What is claimed is:

1. A method of performing tile-based rendering in a graphics processing apparatus, the method comprising:
   receiving a first drawcall to render a first tile of a preceding frame;
   receiving a second drawcall to render a second tile of a succeeding frame, the second tile of the succeeding frame corresponding to a position of the first tile of the preceding frame;
   generating a signature of the first drawcall based on an execution context and graphics data of the first drawcall and generating a signature of the second drawcall based on an execution context and graphics data of the second drawcall;
   comparing the signature of the first drawcall to the signature of the second drawcall and determining whether a pre-set condition is satisfied; and
   rendering the second tile by using a result of a rendering of the first tile when the pre-set condition is satisfied.

2. The method of claim 1, wherein the pre-set condition comprises determining whether the signature of the first drawcall is identical to the signature of the second drawcall.

3. The method of claim 1, further comprising rendering the second tile independent of the result of the rendering of the first tile when the pre-set condition is not satisfied.

4. The method of claim 1, wherein the rendering of the second tile further comprises:
   when there is a dependency between the second tile and the result of rendering the first tile, generating, based on the result of the rendering of the first tile, a dynamic texture for rendering the second tile; and rendering the second tile by using the generated dynamic texture.

5. The method of claim 4, further comprising:
   determining whether a first shader included in the first drawcall and a second shader included in the second drawcall are identical;
   determining whether the dynamic texture is mapped to the first drawcall and the second drawcall; and,
   in response to determining the first shader and the second shader are identical, and the dynamic texture is mapped to the first drawcall and the second drawcall, determining there is a dependency between the second tile and the result of rendering the first tile.

6. The method of claim 1, wherein the execution context and graphics data of the first drawcall and of the second drawcall comprise Open Graphics Library (OpenGL) states, vertex data, index data, attribute data, shaders, and textures regarding the first drawcall and the second drawcall, and
   wherein the signature of the first drawcall and the second drawcall comprise text strings for distinguishing the first drawcall and the second drawcall from each other.

7. The method of claim 1, wherein each of the preceding frame and the succeeding frame are divided into a plurality of equally-sized tiles that are adjacent to one another respectively including one of the first tile and the second tile.

8. The method of claim 1, further comprising determining whether a camera viewpoint regarding the succeeding frame is identical to a camera viewpoint regarding the preceding frame,
   in response to determining that the camera viewpoint regarding the succeeding frame is identical to the camera viewpoint regarding the preceding frame, the signature of the first drawcall is compared to the signature of the second drawcall.

9. The method of claim 1, wherein comparing the signature of the first drawcall to the second drawcall comprises calculating checksums of the signature of the first drawcall and the signature of the second drawcall.

10. A graphics processing apparatus for performing tile-based rendering, the graphics processing apparatus comprising:
    a memory configured to store at least one instruction; and
    at least one processor configured to execute the at least one instruction stored in the memory,
    wherein the at least one processor executes the at least one instruction to receive a first drawcall to render a first tile of a preceding frame, receive a second drawcall to render a second tile of a succeeding frame corresponding to a position of the first tile of the preceding frame, generate a signature of the first drawcall based on an execution context and graphics data of the first drawcall and generate a signature of the second drawcall based on an execution context and graphics data of the second drawcall, compare the signature of the first drawcall to the signature of the second drawcall to determine whether a pre-set condition is satisfied, and render the second tile by using a result of a rendering of the first tile when the pre-set condition is satisfied.

11. The graphics processing apparatus of claim 10, wherein the pre-set condition comprises a determination by the at least one processor determining that the signature of the first drawcall is identical to the signature of the second drawcall.

12. The graphics processing apparatus of claim 10, wherein when the at least one processor determines there is a dependency between the second tile and the result of rendering the first tile, the at least one processor generates a dynamic texture to render the second tile based on the result of rendering the first tile, and renders the second tile by using the generated dynamic texture.

13. The graphics processing apparatus of claim 12, wherein the at least one processor executes the at least one instruction to determine whether a first shader included in the first drawcall and a second shader included in the second drawcall are identical, determine whether the dynamic texture is mapped to the first drawcall and the second drawcall, and when the first shader and the second shader are identical, and the dynamic texture is mapped to the first drawcall and the second drawcall determine there is a dependency between the second tile and the result of rendering the first tile.

14. The graphics processing apparatus of claim 10, wherein the at least one processor generates the signature of the first drawcall and the signature of the second drawcall by using Open Graphics Library (OpenGL) states, vertex data, index data, attribute data, shaders, and textures regarding the first drawcall and the second drawcall, and the signature of the first drawcall and the signature of the second drawcall comprise text strings that distinguish the first drawcall and the second drawcall from each other.

15. The graphics processing apparatus of claim 10, wherein each of the preceding frame and the succeeding frame are each divided into a plurality of equally-sized tiles respectively including one of the first tile and the second tile, wherein each plurality of equally-sized tiles are adjacent to one another.

16. The graphics processing apparatus of claim 10, wherein the at least one processor executes the at least one instruction to determine whether a camera viewpoint regarding the succeeding frame is identical to a camera viewpoint regarding the preceding frame and, when the at least one processor determines that the camera viewpoint regarding the succeeding frame is identical to the camera viewpoint regarding the preceding frame, the at least one processor compares the signature of the first drawcall to the signature of the second drawcall.

17. The graphics processing apparatus of claim 10, wherein the at least one processor compares the signature of the first drawcall to the second drawcall by calculation of a checksum of the signature of the first drawcall and the signature of the second drawcall, and determine whether of the signature of the first drawcall is equal to the checksum of the signature of the second drawcall.

18. The graphics processing apparatus according to claim 10, wherein the at least one processor renders the second tile independent of the first tile when the pre-set condition is not satisfied.

19. The graphics processing apparatus according to claim 10, further comprising:
    an input/output (I/O) interface including at least one channel to an application for communication with a Graphics Processing Unit (GPU), and an output interface for displaying a frame to be rendered to a user;
    a graphics driver configured to fetch drawcalls related frames being processed; and
    a memory configured to store data related to a respective plurality of tiles in the preceding frame and the succeeding frame including the first tile and the second tile, and store information for the at least one processor to identify common tiles in the preceding frame and the succeeding frame.

20. The graphics processing apparatus according to claim 10, wherein the at least one processor is configured to compare the signature of the first drawcall and the signature of the second drawcall by executing at least one of checksum operation, a cyclic redundancy check (CRC), or a hash value of data of the signature of the first drawcall and the signature of the second drawcall.

* * * * *